(12) United States Patent
Sun et al.

(10) Patent No.: US 12,454,995 B2
(45) Date of Patent: Oct. 28, 2025

(54) INTELLIGENT DEVICE FOR DETERMINING OPERATION POINT AND SCREW ROD THEREOF

(71) Applicant: TBI MOTION TECHNOLOGY CO., LTD., New Taipei (TW)

(72) Inventors: Chung-Yuan Sun, New Taipei (TW); Sheng-En Liu, New Taipei (TW)

(73) Assignee: TBI MOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/528,529

(22) Filed: Dec. 4, 2023

(65) Prior Publication Data
US 2025/0137514 A1 May 1, 2025

(30) Foreign Application Priority Data
Oct. 31, 2023 (CN) .......................... 202322937012.4

(51) Int. Cl.
 *F16H 25/20* (2006.01)
 *F16H 25/22* (2006.01)
 *B25B 1/10* (2006.01)

(52) U.S. Cl.
 CPC ..... *F16H 25/2015* (2013.01); *F16H 25/2204* (2013.01); *B25B 1/10* (2013.01); *B25B 1/103* (2013.01)

(58) Field of Classification Search
 CPC ......... F16H 25/2214; F16H 2025/2028; F16H 2025/204; B25B 5/10; B25B 11/002; B25B 1/106; B25B 1/10; F16C 29/0609
 See application file for complete search history.

(56) References Cited

U.S. PATENT DOCUMENTS

| 4,208,045 | A | * | 6/1980 | Rowe ....................... B25B 1/08 |
| | | | | 269/100 |
| 4,797,086 | A | | 1/1989 | Adachi |
| 5,303,604 | A | | 4/1994 | Mayfield |
| 5,311,788 | A | * | 5/1994 | Kasuga ............... F16H 25/2204 |
| | | | | 403/DIG. 1 |

(Continued)

FOREIGN PATENT DOCUMENTS

| CN | 204572979 U | 8/2015 |
| CN | 210147368 U | 3/2020 |

(Continued)

*Primary Examiner* — Gregory Robert Weber
(74) *Attorney, Agent, or Firm* — INNOVATION CAPITAL LAW GROUP, LLP; Vic Lin

(57) ABSTRACT

Provided are an intelligent device for determining an operation point and a screw rod thereof. The intelligent device for determining an operation point includes a linear rail body, the screw rod, a first slide, a second slide, a first ball, and a second ball. The screw rod is disposed on the linear rail body and includes a first screw rod portion and a second screw rod portion. The first screw rod portion and the second screw rod portion that are provided with thread grooves with different directions and different leads respectively. The first slide and second slide are slidably disposed on the linear rail body. The screw rod penetrates through the first slide and the second slide. The balls roll in the thread grooves of screw rod and the ball circulation channels of the slides to roll cyclically between the screw rod and the slides.

12 Claims, 13 Drawing Sheets

(56) References Cited

U.S. PATENT DOCUMENTS

| | | | | |
|---|---|---|---|---|
| 10,066,667 B2* | 9/2018 | Herchenreder | ....... | F16C 29/063 |
| 11,905,990 B2* | 2/2024 | Yu | ....................... | F16C 33/6629 |
| 12,158,196 B2* | 12/2024 | Eriksen | ............... | F16H 25/2015 |
| 2017/0122371 A1 | 5/2017 | Herchenreder et al. | | |

FOREIGN PATENT DOCUMENTS

| | | |
|---|---|---|
| CN | 213393278 U | 6/2021 |
| CN | 218326062 U | 1/2023 |
| CN | 116465649 A | 7/2023 |
| JP | 05038445 U | 5/1993 |
| JP | 2017089836 A | 5/2017 |
| JP | 2023026157 A | 2/2023 |

* cited by examiner

INTELLIGENT DEVICE FOR DETERMINING OPERATION POINT AND SCREW ROD THEREOF

CROSS-REFERENCE TO RELATED APPLICATION

This non-provisional application claims priority under 35 U.S.C. § 119 (a) to patent application No. 202322937012.4 filed in China, P.R.C. on Oct. 31, 2023, the entire contents of which are hereby incorporated by reference.

BACKGROUND

Technical Field

The present invention relates to an intelligent device for determining an operation point and a screw rod thereof, and in particular, to a screw rod having threads with different directions and leads, and an intelligent device for determining an operation point having the screw rod.

Related Art

A single-thread screw rod is disposed on a conventional single axis actuator (Single Axis Actuator) to allow a slide to move in a single direction. However, since the single axis actuator of such a structure can only move an object in a single direction, a determining operation, for example, an operation such as connecting or clamping, cannot be accurately performed on the object, and the single axis actuator also cannot be applied to clamping a right-left asymmetrical object with an uneven center of gravity.

SUMMARY

In view of this, an embodiment provides an intelligent device for determining an operation point, adapted to perform a determining operation on an object and including a linear rail body, a screw rod, a first slide, a second slide, a first ball, and a second ball. The screw rod is disposed on the linear rail body. The screw rod includes a first screw rod portion, a second screw rod portion, and a determining operation area. The first screw rod portion is wrapped with a first thread groove, and the second screw rod portion is wrapped with a second thread groove. The first screw rod portion and the second screw rod portion are located on two opposite ends, and the determining operation area is located between the first screw rod portion and the second screw rod portion. The first thread groove and the second thread groove extend in opposite directions based on the determining operation area, and a lead of the second thread groove is greater than a lead of the first thread groove. The first slide is slidably disposed on the linear rail body and corresponds to a side of the first thread groove. The first slide includes a first slide body. The first slide body is provided with a first through groove and a first ball circulation channel that run through the first slide body in a long axis direction. The screw rod penetrates through the first through groove. The second slide is slidably disposed on the linear rail body and corresponds to a side of the second thread groove. The second slide includes a second slide body. The second slide body is provided with a second through groove and a second ball circulation channel that run through the second slide body in the long axis direction. The screw rod penetrates through the second through groove. The first ball rolls in the first thread groove and the first ball circulation channel to cyclically roll between the screw rod and the first slide. The second ball rolls in the second thread groove and the second ball circulation channel to cyclically roll between the screw rod and the second slide. The first slide and the second slide move toward the determining operation area respectively to perform the determining operation on the object at a position corresponding to the determining operation area.

Further, in an embodiment, a screw rod is provided and includes a first screw rod portion, a second screw rod portion, and a determining operation area. The first screw rod portion is located at an opposite end of the second screw rod portion, and is provided with a first thread groove. The second screw rod portion is provided with a second thread groove. The determining operation area is located between the first screw rod portion and the second screw rod portion. The first thread groove and the second thread groove extend in opposite directions based on the determining operation area, and a lead of the second thread groove is greater than a lead of the first thread groove.

In some embodiments, a ratio of the lead of the first thread groove to the lead of the second thread groove is greater than or equal to ⅕.

In some embodiments, a ratio of a length of the first screw rod portion to a length of the second screw rod portion is greater than or equal to ⅕.

In some embodiments, the first thread groove has a first length from a thread starting point adjacent to the determining operation area to a thread end point away from the determining operation area, the second thread groove has a second length from a thread starting point adjacent to the determining operation area to a thread end point away from the determining operation area, and a ratio of the first length to the second length is greater than or equal to ⅕.

In some embodiments, the first screw rod portion includes an extending section located at a position that is away from a tail end of the determining operation area, and a ratio of a length of the first screw rod portion to a length of the second screw rod portion is equal to 1.

In some embodiments, a plurality of third balls and a plurality of fourth balls are further included, and the first slide further includes a plurality of first return members disposed at two ends of the first slide body in the long axis direction respectively. The first slide body includes a first return channel running through the first slide body in the long axis direction and a first circulation groove extending in the long axis direction. Each first return member includes a first return member body, a first return groove, a first end, and a second end. The first end and the second end protrude from the first return member body and face toward a same side. The first end is connected to the first return channel, and the second end is connected to the first circulation groove, to make the first return channel, the first return groove, and the first circulation groove in communication, and enable the plurality of third balls to roll in the first return channel, the first return groove, and the first circulation groove. The second slide further includes a plurality of second return members disposed at two ends of the second slide body in the long axis direction respectively. The second slide body includes a second return channel running through second slide body in the long axis direction and a second circulation groove extending in the long axis direction. Each second return member includes a second return member body, a second return groove, a third end, and a fourth end. The third end and the fourth end protrude from the second return member body and face toward a same side. The third end is connected to the second return channel, and the fourth end is connected to the second circulation groove, to make the second return channel, the second return groove, and the second circulation groove in communication, and enable the plurality of fourth balls to roll in the second return channel, the second return groove, and the second circulation groove.

In some embodiments, the second end of the first return member forms a first engaging portion that tapers in an assembly direction, an end of the first circulation groove that corresponds to the first engaging portion forms a first engaging groove that tapers in the assembly direction, and the first return member is engaged with the first engaging groove through the first engaging portion. The fourth end of the second return member forms a second engaging portion that tapers in the assembly direction, an end of the second circulation groove that corresponds to the second engaging portion forms a second engaging groove that tapers in the assembly direction, and the second return member is engaged with the second engaging groove through the second engaging portion.

In some embodiments, the first slide further includes two first end covers. The two first end covers are disposed at two ends of the first slide body respectively. Each first end cover is provided with a first assembly groove corresponding to the first return member. An end of the first return member that corresponds to the first assembly groove forms a first lead angle portion. A gap between the first lead angle portion and the first assembly groove forms a first oil path. The second slide further includes two second end covers. The two second end covers are disposed at two ends of the second slide body respectively. Each second end cover is provided with a second assembly groove corresponding to the second return member. An end of the second return member that corresponds to the second assembly groove forms a second lead angle portion. A gap between the second lead angle portion and the second assembly groove forms a second oil path.

In some embodiments, an end of the first assembly groove that faces the first return member is provided with a first assembly groove edge, and the first assembly groove edge is rounded. An end of the second assembly groove that faces the second return member is provided with a second assembly groove edge, and the second assembly groove edge is rounded.

In some embodiments, a motor is disposed on the linear rail body, and the motor is located on a side of the first screw rod portion.

In some embodiments, two limiting devices are further included. One of the two limiting devices is disposed at an end of the linear rail body that is opposite to the first screw rod portion. The other of the two limiting devices is disposed at an end of the linear rail body that is opposite to the second screw rod portion.

In some embodiments, two position sensing devices are further included. The two position sensing devices are disposed on the linear rail body corresponding to the first slide the second slide respectively, and move with the first slide and the second slide respectively.

In some embodiments, the linear rail body includes two anti-collision strips, and the two anti-collision strips are disposed on two opposite ends of the linear rail body respectively.

In conclusion, this application provides an intelligent device for determining an operation point and a screw rod thereof according to an embodiment. The screw rod includes both threads in opposite directions, and the threads have different leads. For example, a left-hand thread has a shorter lead and a right-hand thread has a longer lead. In this way, the first slide and the second slide that slide on the threads respectively may generate a moving distance difference, and are applied to clamping an object with uneven left and right sides and an offset center of gravity, to position the object in the determining operation area corresponding to the screw rod. Alternatively, objects clamped on the left and right may approach to each other according to the different required strokes to be combined, or assembled into another component.

DETAILED DESCRIPTION

Figure 1:
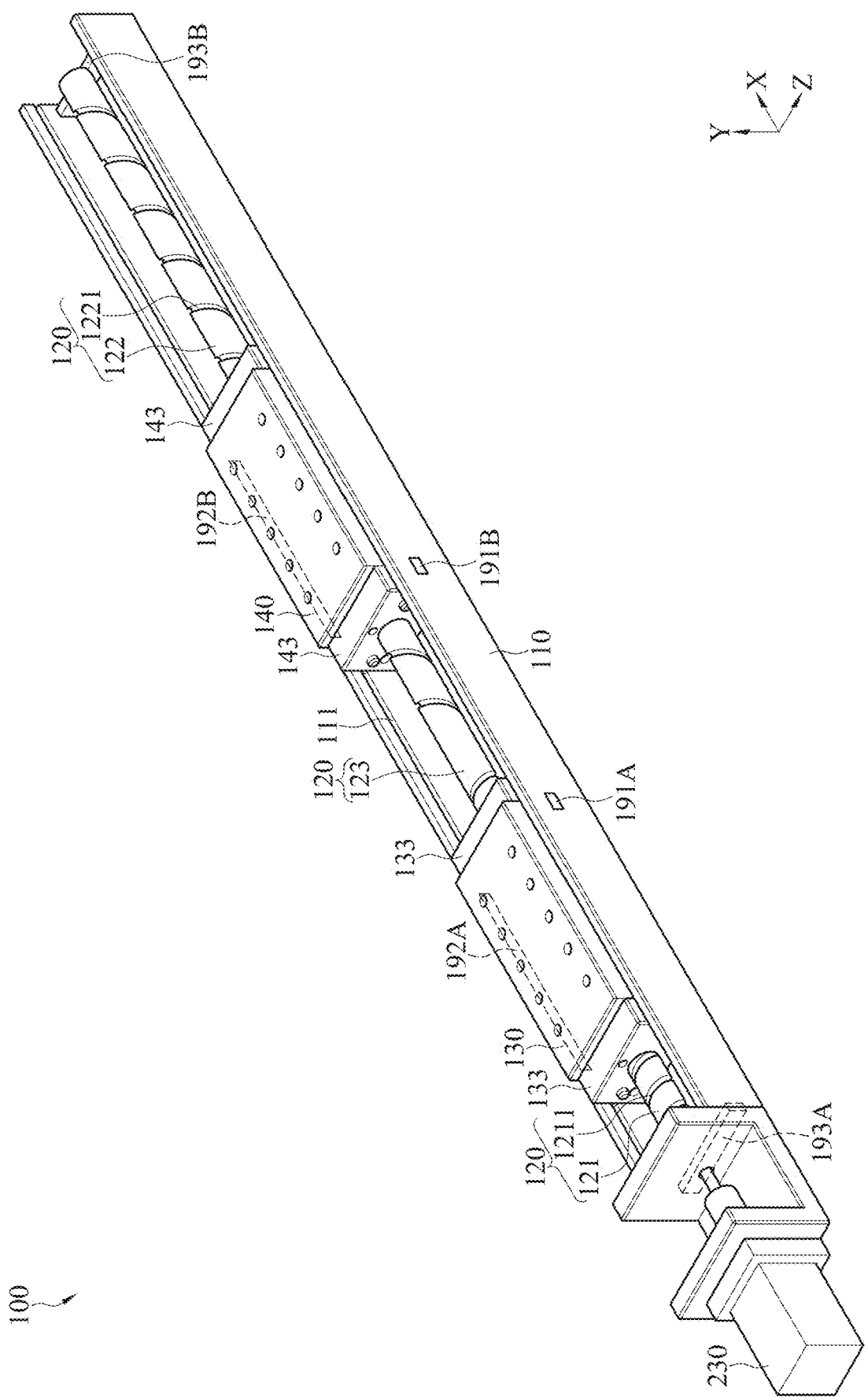
FIG. 1 is a three-dimensional diagram of an intelligent device for determining an operation point according to an embodiment.
Figure 2:
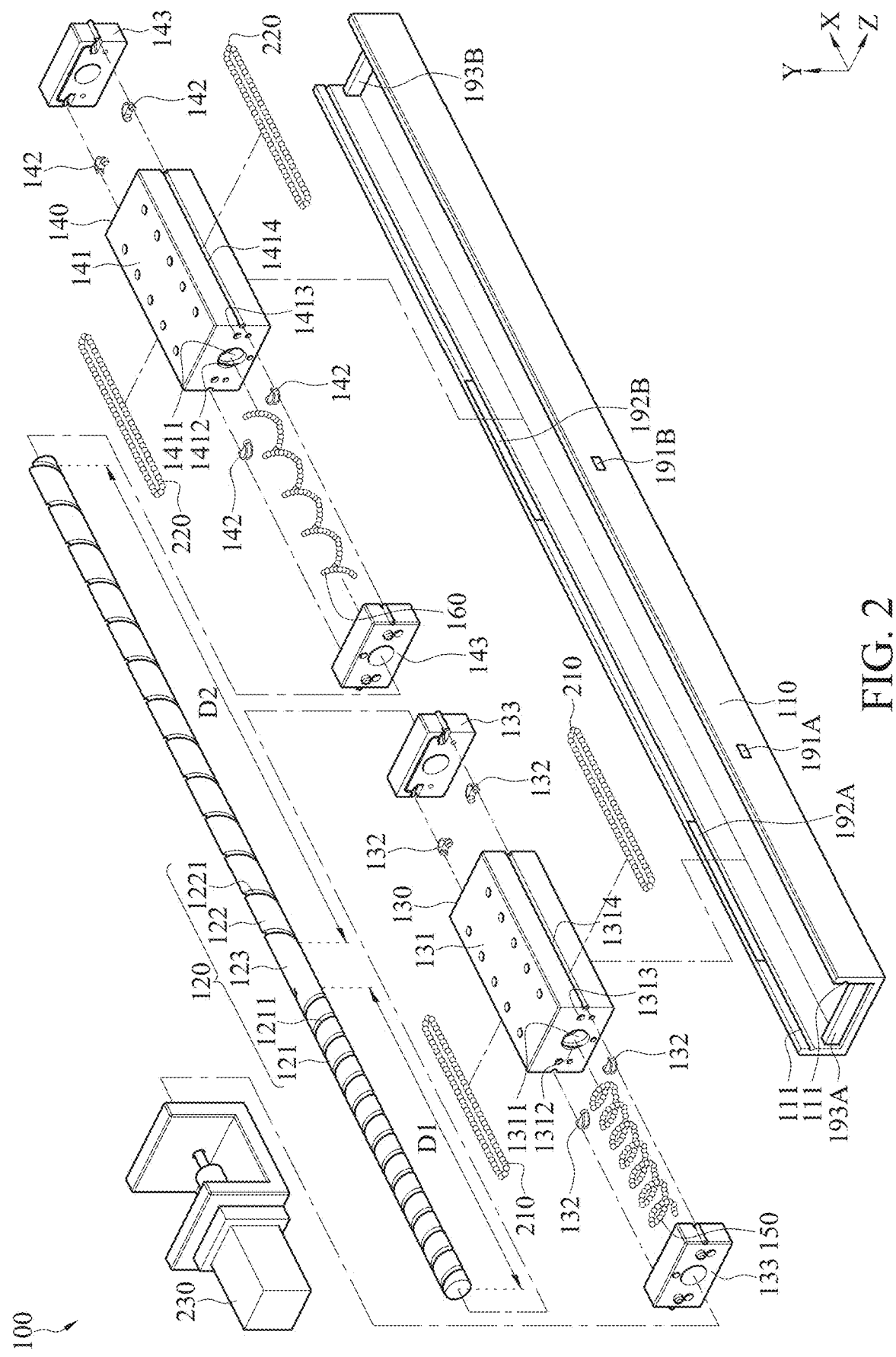
FIG. 2 is an exploded view of an intelligent device for determining an operation point according to an embodiment.
Figure 3:
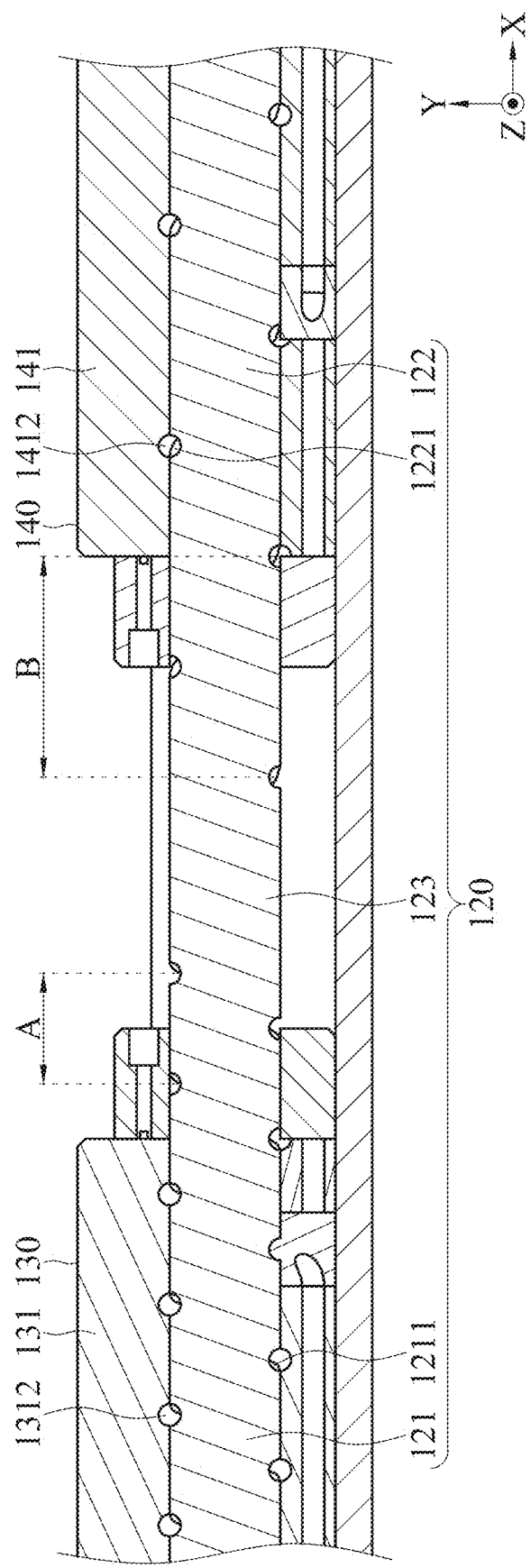
FIG. 3 is a cross-sectional view along an X-axis direction in FIG. 1.

Refer to FIG. 1 to FIG. 3. FIG. 1 is a three-dimensional diagram of an intelligent device for determining an operation point according to an embodiment. FIG. 2 is an exploded view of an intelligent device for determining an operation point according to an embodiment. FIG. 3 is a cross-sectional view along a cross section 3-3 in FIG. 1. As shown in FIG. 1 and FIG. 2, a screw rod 120 includes a first screw rod portion 121, a second screw rod portion 122, and a determining operation area (determining operation area) 123. The first screw rod portion 121 and the second screw rod portion 122 are located at two opposite ends and are respectively wrapped with a first thread groove 1211 and a second thread groove 1221. The determining operation area 123 is located between the first screw rod portion 121 and the second screw rod portion 122 and has an unthreaded surface, and the first thread groove 1211 and the second thread groove 1221 extend in opposite directions based on the determining operation area 123. A lead B of the second thread groove 1221 is greater than a lead A of the first thread groove 1211. The lead refers to a straight-line distance of a revolution of a spiral. In this embodiment, the lead refers to a distance by which a slide moves in a revolution of the screw rod. As shown in FIG. 3, the lead A refers to a straight-line distance between two adjacent threads on an upper side or a lower side of the first thread groove 1211, and the lead B refers to a straight-line distance between two adjacent threads on an upper side or a lower side of the second thread groove 1221.

As shown in FIG. 3, the first thread groove 1211 and the second thread groove 1221 have opposite directions. In this embodiment, the first thread groove 1211 is a left-hand thread, and the second thread groove 1221 is a right-hand thread, but it is not limited thereto. In another implementation, the first thread groove 1211 may be a right-hand thread, and the second thread groove 1221 may be a left-hand thread. In this embodiment, a ratio of the lead A of the first thread groove 1211 to the lead B of the second thread groove 1221 is greater than or equal to ⅕. For example, the ratio of the lead A to the lead B may be any ratio such as 1:1.5, 1:2, 1:3, or 1:5.

In this embodiment, a second length D2 of the second thread groove 1221 is greater than a first length D1 of the first thread groove 1211, and a ratio of the first length D1 of the first thread groove 1211 to the second length D2 of the second thread groove 1221 is greater than or equal to ⅕. The first length D1 of the first thread groove 1211 refers to a distance from a thread starting point of the first thread groove 1211 adjacent to the determining operation area 123 to a thread end point away from the determining operation area 123. The second length D2 of the second thread groove 1221 refers to a distance from a thread starting point of the second thread groove 1221 adjacent to the determining operation area 123 to a thread end point away from the determining operation area 123. That is to say, lengths of two thread grooves may be different and have a specific proportional relationship. Further, a length relationship between the two thread grooves may be the same as a relationship between the leads of the two thread grooves. For example, when the ratio of the lead A of the first thread groove 1211 to the lead B of the second thread groove 1221 is ½, the ratio of the first length D1 of the first thread groove 1211 and the second length D2 of the second thread groove 1221 is also ½.

In this embodiment, the first screw rod portion 121 and the second screw rod portion 122 are respectively covered with thread grooves, but are not limited thereto. In another implementation, the first screw rod portion 121 and the second screw rod portion 122 may each have an unthreaded surface, or one of the first screw rod portion 121 and the second screw rod portion 122 may have an unthreaded surface, and a ratio of a length of the first screw rod portion 121 to a length of the second screw rod portion 122 is greater than or equal to ⅕. For example, when the first screw rod portion 121 includes an extending section with an unthreaded surface, a ratio of a distance from an end of the first screw rod portion 121 to a left side of the determining operation area 123 (the extending section with the unthreaded surface plus a threaded surface) to a distance from an end of the second screw rod portion 122 to a right side of the determining operation area 123 is greater than or equal to ⅕. Further, in another implementation, the foregoing ratio is 1, and an embodiment of an unthreaded extending section is described in detail later.

Still referring to FIG. 1 and FIG. 2, the screw rod 120 may be used in, for example, a screw rod slide module. In this embodiment, using an example in which an intelligent device for determining an operation point 100 is screw rod slide module, the intelligent device for determining an operation point 100 is adapted to perform a determining operation on an object and includes a linear rail body 110, the foregoing screw rod 120, a first slide 130, a second slide 140, a first ball 150, and a second ball 160. In another implementation, the screw rod 120 may also be used in other types of screw rod slide modules.

Rail grooves 111 are provided on a left side and a right side of the linear rail body 110 respectively. In this embodiment, an example in which each side is provided with one rail groove 111 is used, but it is not limited to this. In another implementation, according to design requirements, more than two rail grooves may be respectively provided on two sides.

Two opposite ends of the screw rod 120 are respectively disposed at two ends of the linear rail body 110 and are disposed parallel to the rail groove 111.

As shown in FIG. 2 and FIG. 3, the first slide 130 is slidably disposed on the linear rail body 110 and corresponds to a side of the first thread groove 1211. The first slide 130 includes a first slide body 131. The first slide body 131 is provided with a first through groove 1311 and a first ball circulation channel 1312 that run through the first slide body 131 in a long axis direction (that is, an X-axis direction) of the screw rod 120. The screw rod 120 penetrates through the first through groove 1311 in a direction parallel to the long axis direction X. In this embodiment, the first ball circulation channel 1312 corresponds to the first thread groove 1211 to form a channel for the first ball 150 to roll.

The second slide 140 is slidably disposed on the linear rail body 110 and corresponds to a side of the second thread groove 1221. The second slide 140 includes a second slide body 141. The second slide body 141 is provided with a second through groove 1411 and a second ball circulation channel 1412 that run through the second slide body 141 in the long axis direction X. The screw rod 120 penetrates through the second through groove 1411 in a direction parallel to the long axis direction X. In this embodiment, the second ball circulation channel 1412 corresponds to the second thread groove 1221 to form a channel for the second ball 160 to roll.

The first ball 150 rolls in the first thread groove 1211 and the first ball circulation channel 1312 to cyclically roll between the screw rod 120 and the first slide 130. The second ball 160 rolls in the second thread groove 1221 and the second ball circulation channel 1412 to cyclically roll between the screw rod 120 and the second slide 140. In this embodiment, since the first thread groove 1211 and the second thread groove 1221 are threads in different directions respectively, the first slide 130 and the second slide 140 corresponding to the first thread groove 1211 and the second thread groove 1221 respectively move toward two ends in the long axis direction X when the screw rod 120 rotates, to move away from each other or to approach to each other. In this embodiment, since the lead A of the first thread groove 1211 is less than the lead B of the second thread groove 1221, a distance by which the second slide 140 moves in at each rotation of the screw rod 120 is greater than that of the first slide 130. In this embodiment, the first slide 130 and the second slide 140 move toward the determining operation area 123 respectively, and perform a determining operation on the object in the corresponding determining operation area 123. Detailed descriptions of the determining operation are described below in detail.

Specifically, the screw rod 120 of the intelligent device for determining an operation point 100 includes both the first thread groove 1211 and the second thread groove 1221 that are in opposite directions and that have the lead A and the leads B respectively. In this way, when the screw rod 120 rotates, the first slide 130 and the second slide 140 move in opposite directions relative to the determining operation area 123 respectively and approach, and have different movement strokes, to be applied to clamping an object with asymmetrical left and right sizes and shapes, for example, a bicycle bracket (described below in detail), to position a joint of the object at a position corresponding to the determining operation area 123 of the screw rod 120 located at the eccentric position in this embodiment, thereby completing the determining operation on the connected object. In addition, the first slide 130 and the second slide 140 may also be applied to clamping an object with an offset center of gravity, to, for example, position the center of gravity of the object with the offset center of gravity above the corresponding determining operation area 123. In this case, when the first slide 130 and the second slide 140 approach to each other, due to the different movement strokes, the determining operation for clamping the object can be completed at an offset position (that is, a position corresponding to the determining operation area 123).

Figure 4:
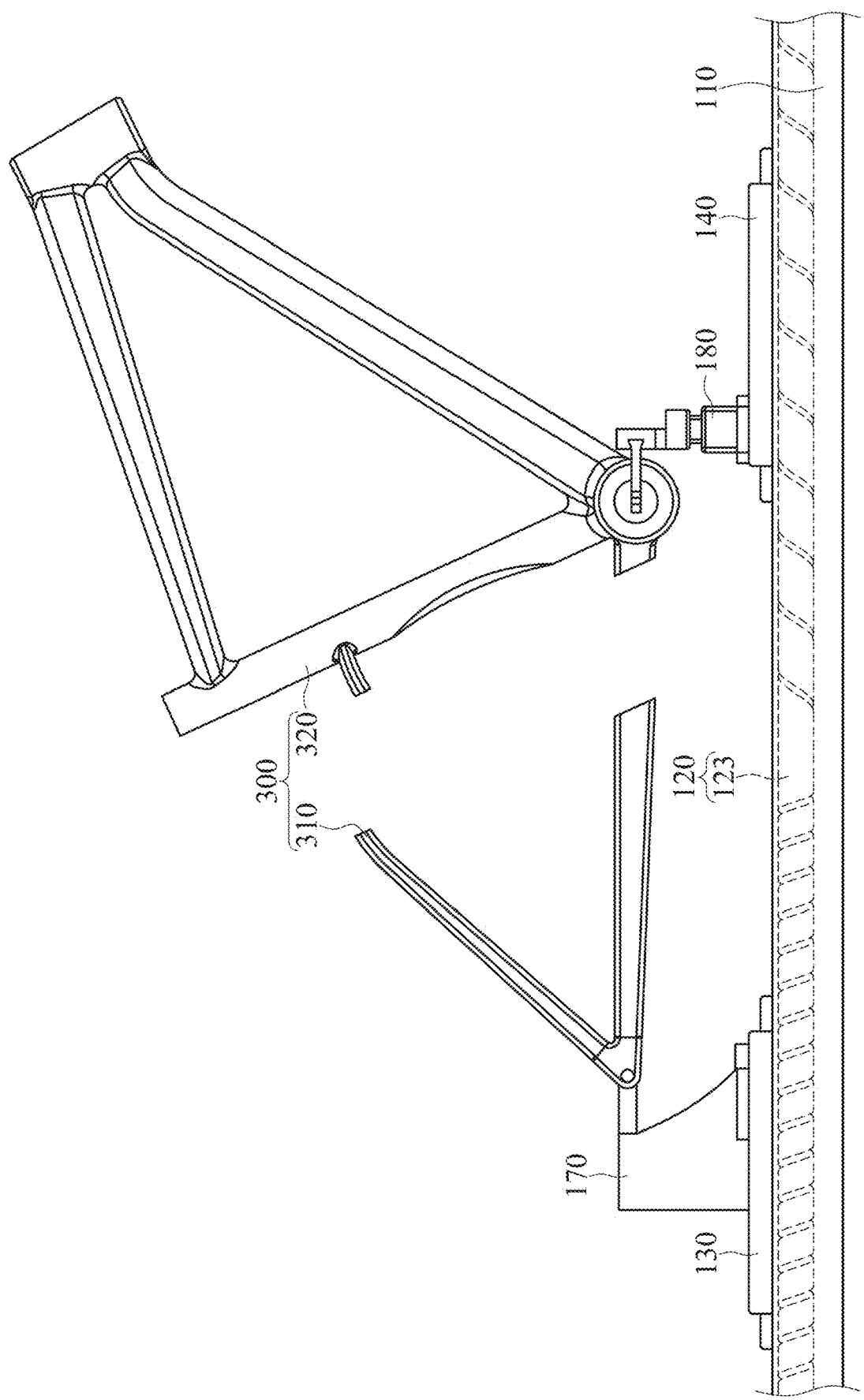
FIG. 4 is a schematic diagram (1) of use of an intelligent device for determining an operation point according to an embodiment.
Figure 5:
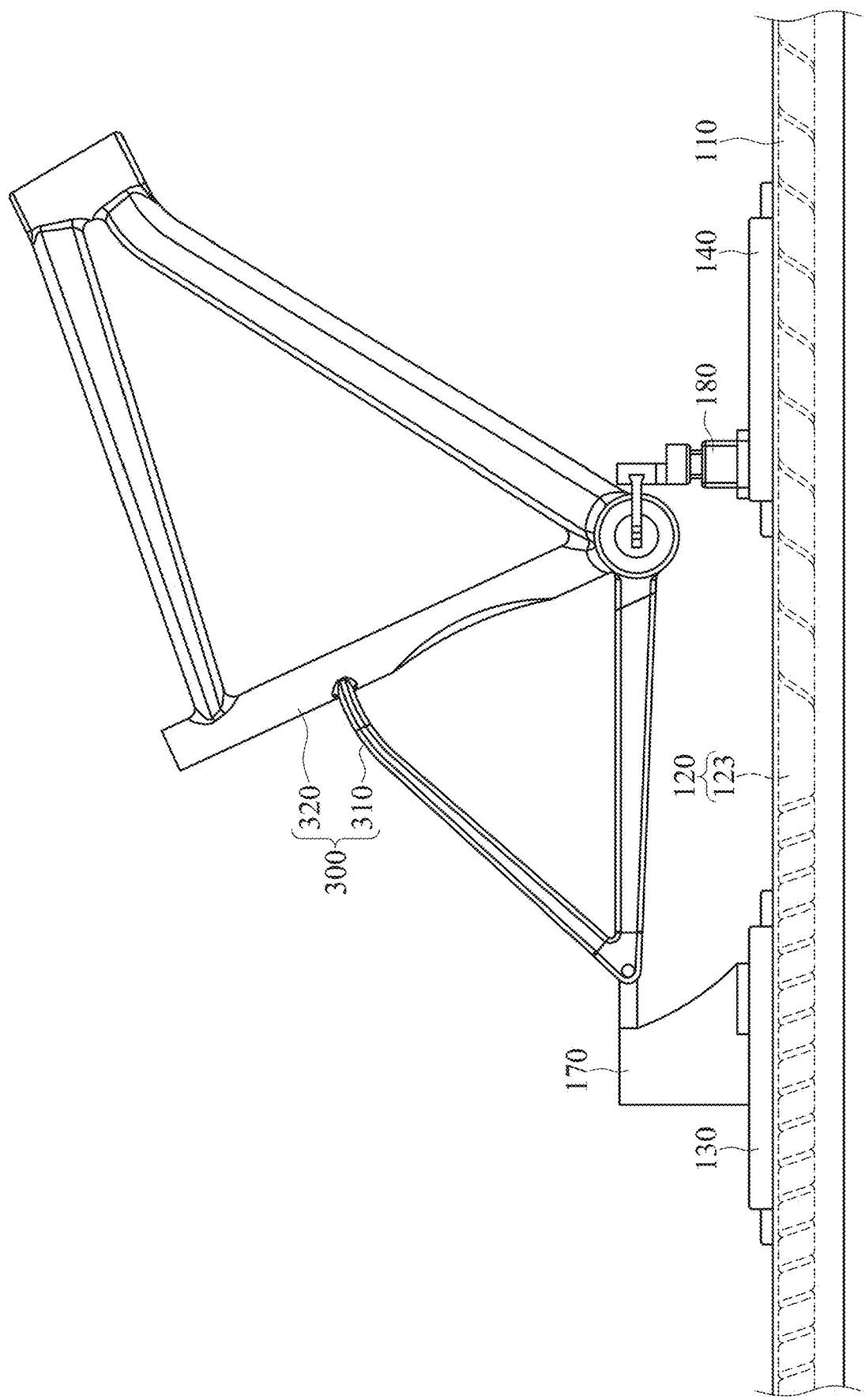
FIG. 5 is a schematic diagram (2) of use of an intelligent device for determining an operation point according to an embodiment.

For the application of the intelligent device for determining an operation point 100, refer to FIG. 4 and FIG. 5 first. FIG. 4 is a schematic diagram (1) of use of an intelligent device for determining an operation point according to an embodiment. FIG. 5 is a schematic diagram (2) of use of an intelligent device for determining an operation point according to an embodiment. As shown in FIG. 4 and FIG. 5, the intelligent device for determining an operation point 100 may be applied to clamping an object with uneven left and right lengths or sizes and an offset center of gravity, for example, a bracket 300 of a bicycle. In this embodiment, a clamping member, such as a clamping claw, a clamping hand, and a clamping finger, may be assembled on the first slide 130 and the second slide 140 to clamp the object (such as the bracket 300), and the determining operation (which, herein, refers to some mutual connection operations) is performed on the object (the bracket 300) above the corresponding determining operation area 123. As shown in FIG. 4, the bracket 300 includes a first bracket portion 310 and a second bracket portion 320, and the first bracket portion 310 and the second bracket portion 320 respectively have different shapes and sizes. The first slide 130 is assembled with a first clamping member 170 and clamps the first bracket portion 310, and the second slide 140 is assembled with a second clamping member 180 and clamps the second bracket portion 320. The first slide 130 and the second slide 140 approach to each other respectively with the different leads A and B, so that the first bracket portion 310 is in close contact with the second bracket portion 320, and a connection operation on an upper end portion of the bracket 300 is performed above the determining operation area 123 corresponding to the offset center on the screw rod 120. In this way, the first bracket portion 310 and the second bracket portion 320 with different shapes and sizes may be fixed to each other through welding to form the complete bracket 300.

In this embodiment, since the first bracket portion 310 and the second bracket portion 320 of the bracket 300 are asymmetric objects respectively, and have different movement strokes through the first slide 130 and the second slide 140, clamped positions may be adjusted according to lengths, shapes, and the like of the objects, so that the bracket 300 is in a stable state.

Figure 6A:
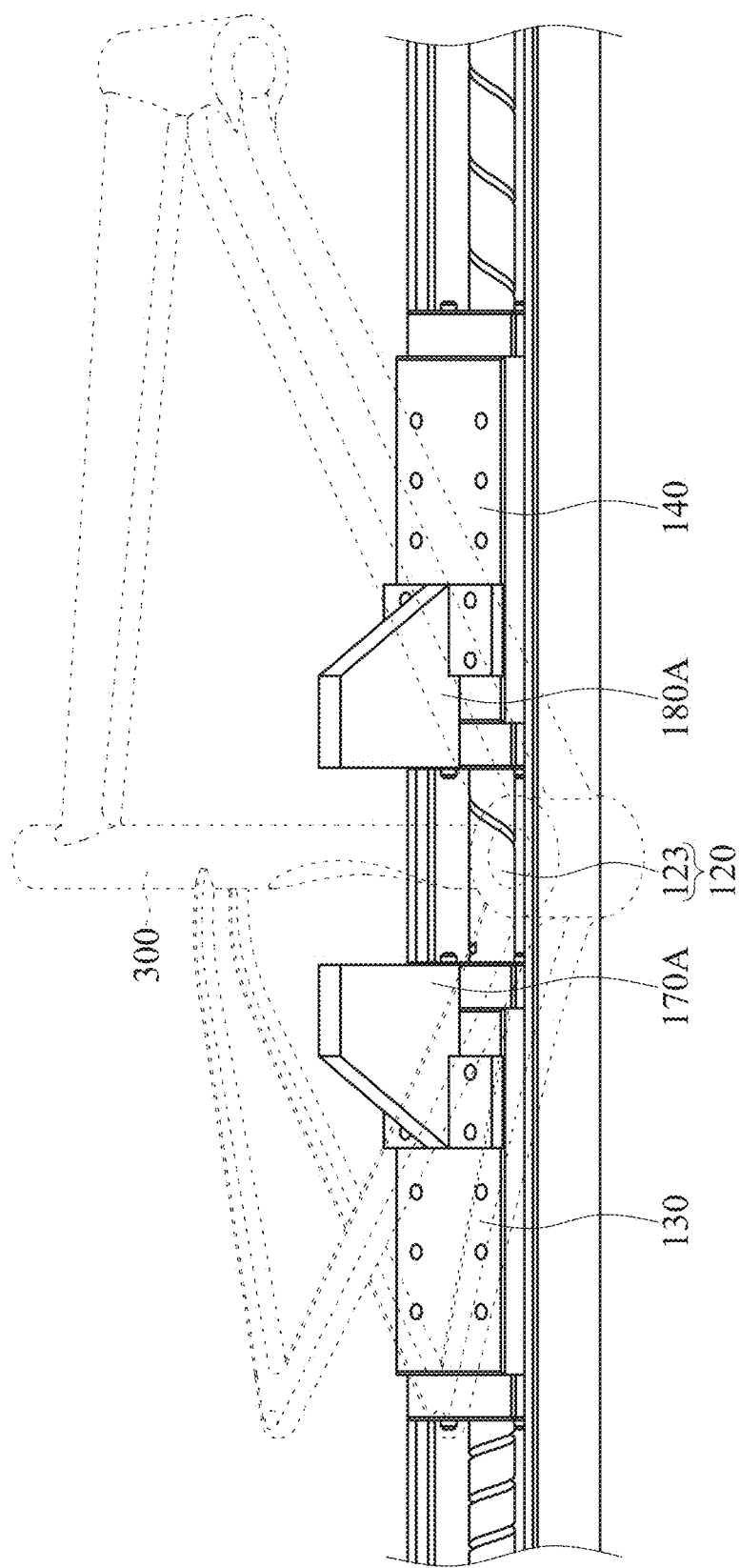
FIG. 6A is a schematic diagram (1) of an operation of an intelligent device for determining an operation point according to an embodiment.
Figure 6B:
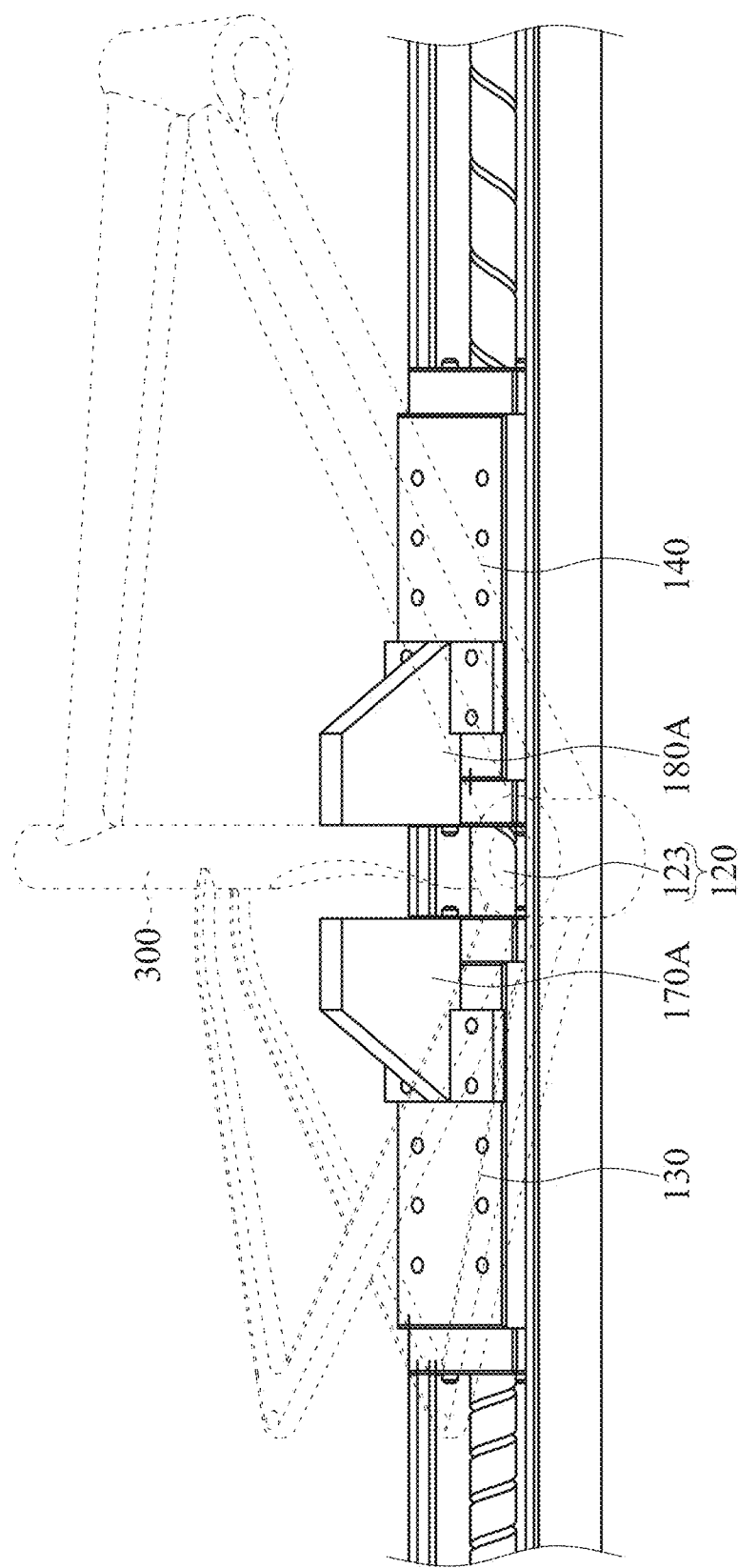
FIG. 6B is a schematic diagram (2) of an operation of an intelligent device for determining an operation point according to an embodiment.
Figure 6C:
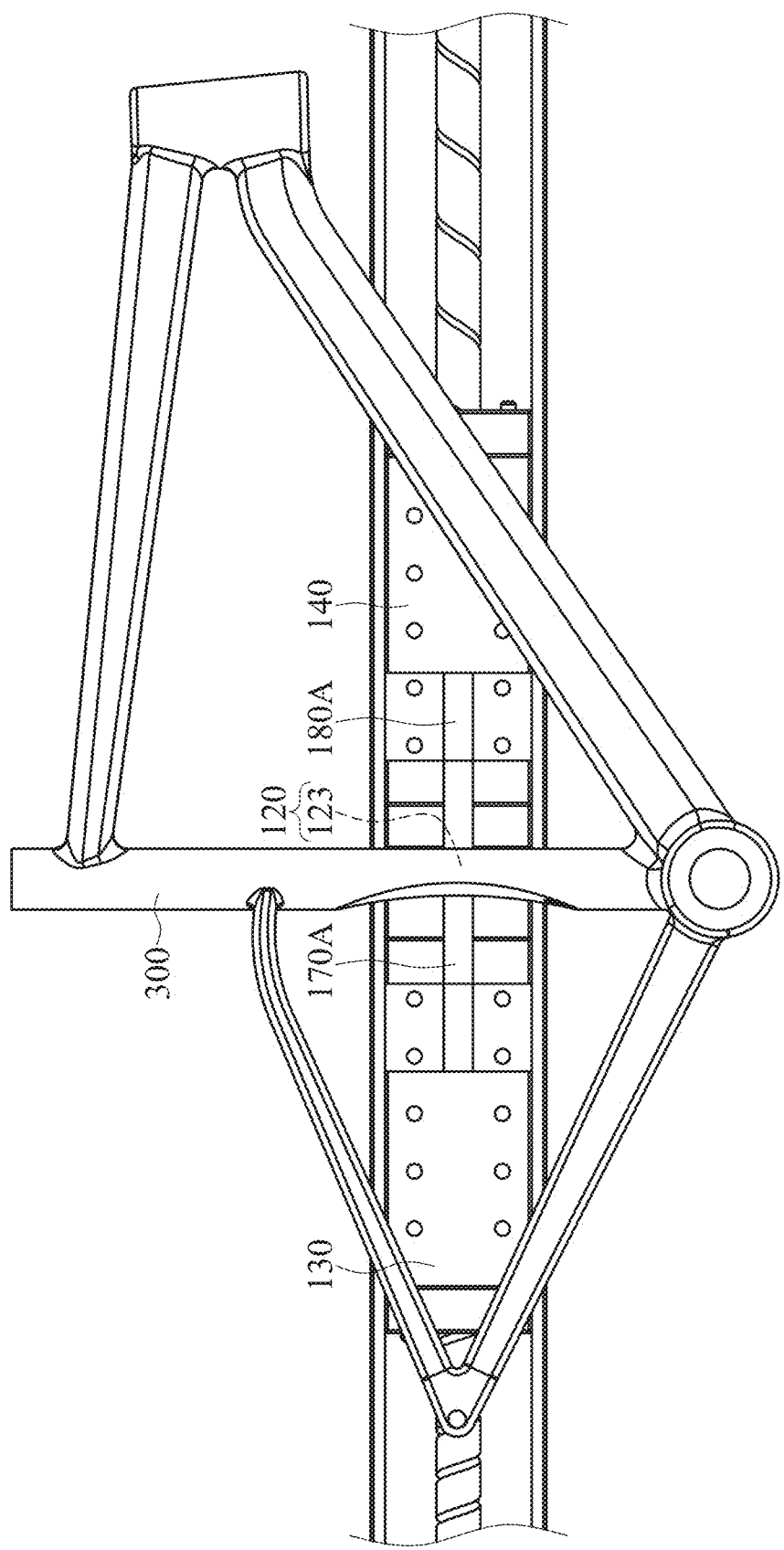
FIG. 6C is a schematic diagram (3) of an operation of an intelligent device for determining an operation point according to an embodiment.

In this embodiment, in addition to being applied to welding of the bracket 300 with different bracket portions, as shown in FIG. 6A to FIG. 6C, the intelligent device for determining an operation point 100 may also be configured to directly clamp the complete bracket 300 to assemble the bracket 300 with other objects, such as a seat, pedals, and the like. In addition, the bracket 300 can also be clamped at different angles according to the different clamps that are used.

For the determining operation, further, refer to FIG. 6A to FIG. 6C. FIG. 6A is a schematic diagram (1) of an operation of an intelligent device for determining an operation point according to an embodiment. FIG. 6B is a schematic diagram (2) of an operation of an intelligent device for determining an operation point according to an embodiment. FIG. 6C is a schematic diagram (3) of an operation of an intelligent device for determining an operation point according to an embodiment. As shown in FIG. 6A to FIG. 6C, a specific operation process of the intelligent device for determining an operation point 100 is explained by using a complete bracket 300 lying horizontally as an example. First, as shown in FIG. 6A, the complete bracket 300 is moved to a pending region through a conveying device, such as a conveyor belt, to be clamped by the first slide 130 and the second slide 140. Then, as shown in FIG. 6B, the first slide 130 and the second slide 140 approach to the bracket 300 with different leads A and B respectively. Since the lead B of the second screw rod portion 122 corresponding to the second slide 140 is larger, the second slide 140 moves by a larger distance, and a second clamping member 180A on the second slide 140 comes into contact with the bracket 300 first. Finally, as shown in FIG. 6C, the first clamping member 170A and the second clamping member 180A continue to approach to each other until a determining operation (which, herein, refers to a clamping operation) is completed on the bracket 300 in the determining operation area 123 corresponding to an eccentric position of the screw rod 120.

In this embodiment, the intelligent device for determining an operation point 100 can also be processed and assembled through adsorption or assembly. In this embodiment, in addition to an object with an asymmetric shape and size, the intelligent device for determining an operation point 100 may also be configured to clamp an object with an uneven weight. By clamping an eccentric position of the object, the object can be stably fixed to facilitate other processing and assembly.

Still referring to FIG. 1, in this embodiment, the intelligent device for determining an operation point 100 further includes two limiting devices 191A and 191B. The limiting device 191A is disposed on the linear rail body 110 at a position relative to one end of the first screw rod portion 121, for example, disposed at a right end of the first screw rod portion 121 in FIG. 1. The limiting device 191B is disposed on the linear rail body 110 at a position relative to one end of the second screw rod portion 122, for example, disposed at a left end of the second screw rod portion 122 in FIG. 1. In this embodiment, the limiting devices 191A and 191B are, for example, infrared sensing devices or optical sensing devices. When the first slide 130 moves to a position at which the limiting device 191A is disposed or the second slide 140 moves to a position at which the limiting device 191B is disposed, the limiting device 191A or 191B sends a signal to a processor, and the processor controls the screw rod 120 to stop rotating, to limit the movement of the first slide 130 and the second slide 140. For positions of disposing the limiting devices 191A and 191B, in another implementation, using the limiting device 191A as an example, one limiting device 191A may be disposed at each of positions on the linear rail body 110 that are relative to two ends of the first screw rod portion 121.

In this embodiment, the intelligent device for determining an operation point 100 further includes two position sensing devices 192A and 192B. The two position sensing devices 192A and 192B are disposed on the linear rail body 110 corresponding to the first slide 130 and the second slide 140 respectively. In this embodiment, the position sensing devices 192A and 192B are, for example, optical scales or magnetic scales. The position sensing devices 192A and 192B monitor movement statuses of the first slide 130 and the second slide 140 through sensing members attached to the slides, for example, information of a relative position from a starting point and an end point, so that an exact direction and an exact distance of displacement of a mechanism can be learned of.

In this embodiment, the linear rail body 110 includes two anti-collision strips 193A and 193B. The two anti-collision strips 193A and 193B are disposed on two opposite ends of the linear rail body 110 respectively. The anti-collision strips 193A and 193B are, for example, soft rubber, to prevent collision at a bottom end when the first slide 130 and the second slide 140 move to two ends of the linear rail body 110.

Still referring to FIG. 1 and FIG. 2, the intelligent device for determining an operation point 100 further includes a motor 230. The motor 230 is disposed on a side of the linear rail body 110 that is close to the first screw rod portion 121. The motor 230 is disposed on a side of the first screw rod portion 121 which is shorter than the second screw rod portion 122, so that a weight of the entire intelligent device for determining an operation point 100 at two ends of the determining operation area 123 can be averaged, and power consumption can be reduced, and a side of the second screw rod portion 122 may not be occupied, to reserve more space.

Figure 7:
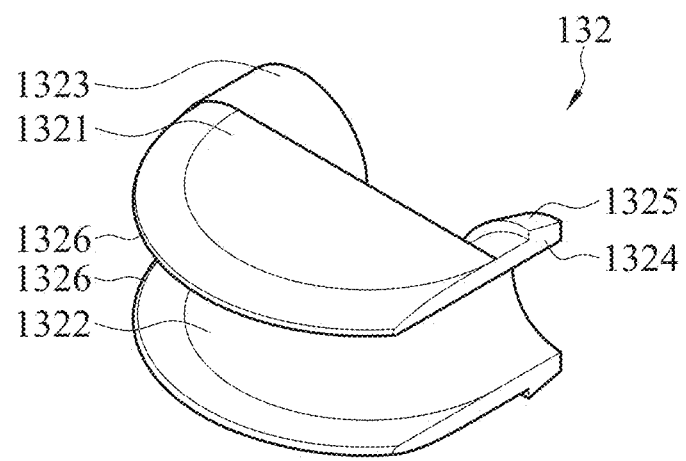
FIG. 7 is a three-dimensional diagram of a first return member of an intelligent device for determining an operation point according to an embodiment.
Figure 8:
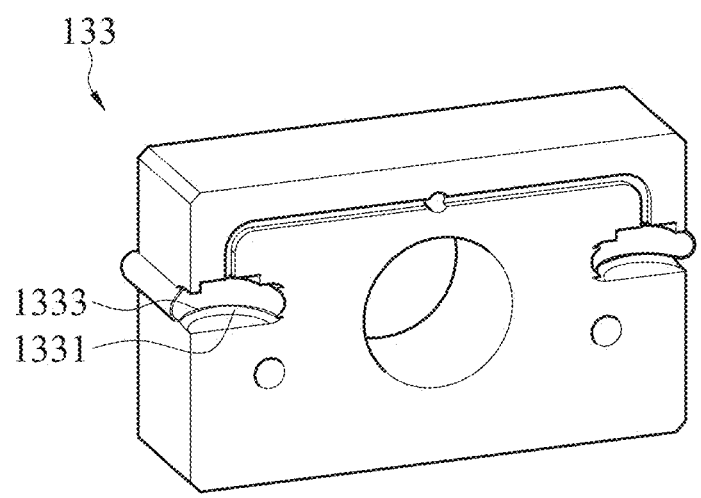
FIG. 8 is a three-dimensional diagram of a first end cover of an intelligent device for determining an operation point according to an embodiment.
Figure 9:
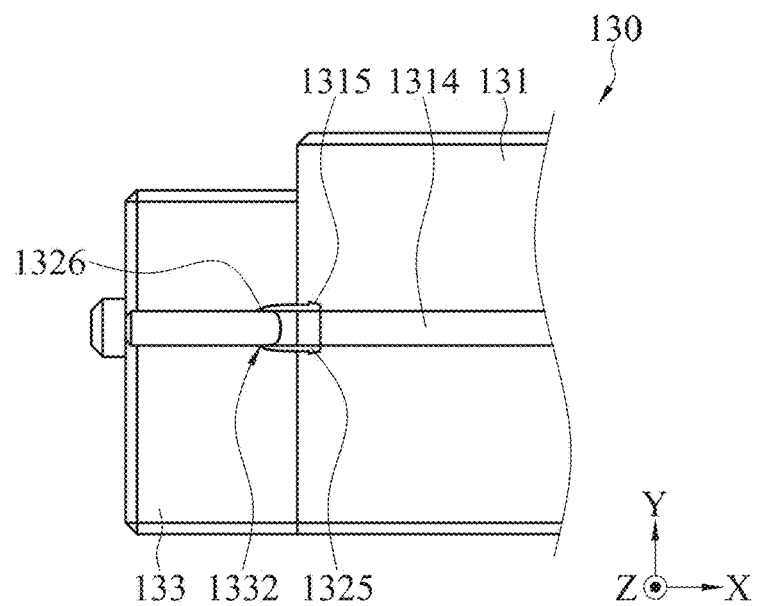
FIG. 9 is a schematic diagram of assembly of a first end cover, a first return member, and a first slide of an intelligent device for determining an operation point according to an embodiment.

Refer to FIG. 2, and also refer to FIG. 7 to FIG. 9. FIG. 7 is a three-dimensional diagram of a first return member of an intelligent device for determining an operation point according to an embodiment. FIG. 8 is a three-dimensional diagram of a first end cover of an intelligent device for determining an operation point according to an embodiment. FIG. 9 is a schematic diagram of assembly of a first end cover, a first return member, and a first slide of an intelligent device for determining an operation point according to an embodiment. The intelligent device for determining an operation point 100 further includes a plurality of third balls 210 and a plurality of fourth balls 220, and the first slide 130 and the second slide 140 respectively include a plurality of first return members 132 and a plurality of second return members 142. As shown in FIG. 2, there are four first return members 132 and four second return members 142 respectively. Using a group of first return members 132 on a side of the first slide body 131 as an example, the first return members 132 are disposed in a group of two respectively at two ends of the first slide body 131. As shown in FIG. 2, FIG. 7, and FIG. 9, two first return members 132 are respectively disposed at two ends of the first slide body 131 in the long axis direction X. The first slide body 131 includes a first return channel 1313 running through first slide body 131 in the long axis direction X and a first circulation groove 1314 extending in the long axis direction X. Each first return member 132 includes a first return member body 1321, a first return groove 1322, a first end 1323, and a second end 1324. The first end 1323 and the second end 1324 are connected to the first return member body 1321 and protrude toward a same side from the first return member body 1321. In this embodiment, the first return member 132 is formed into a rough C shape. When the first return member 132 is assembled to the first slide body 131, the first end 1323 is connected to the first return channel 1313, and the second end 1324 is connected to the first circulation groove 1314, to make the first return channel 1313, the first return groove 1322, and the first circulation groove 1314 in communication, and enable the plurality of third balls 210 to roll in the first return channel 1313, the first return groove 1322, and the first circulation groove 1314. In this way, the third balls 210 cyclically roll between the linear rail body 110 and the first slide 130, to enable the first slide 130 to slide on the linear rail body 110.

Figure 11:
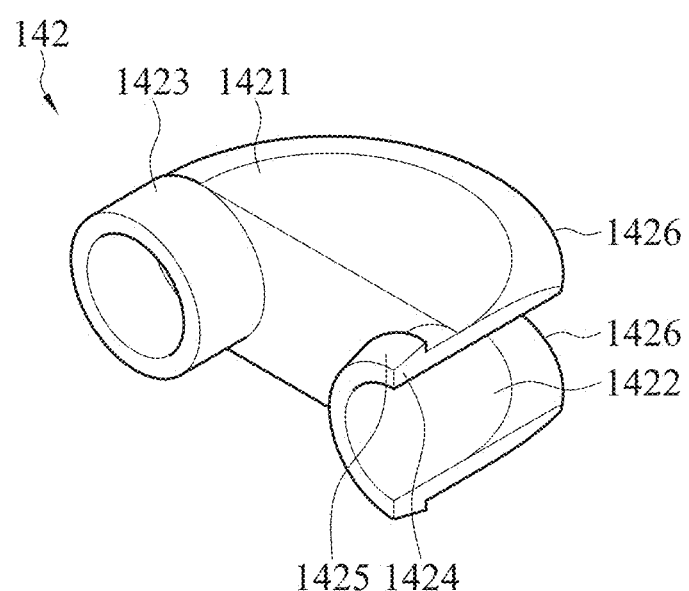
FIG. 11 is a three-dimensional diagram of a second return member of an intelligent device for determining an operation point according to an embodiment.
Figure 12:
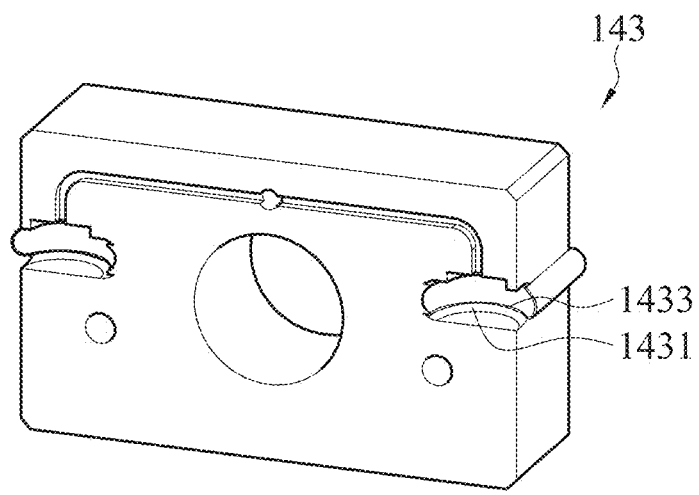
FIG. 12 is a three-dimensional diagram of a second end cover of an intelligent device for determining an operation point according to an embodiment.
Figure 13:
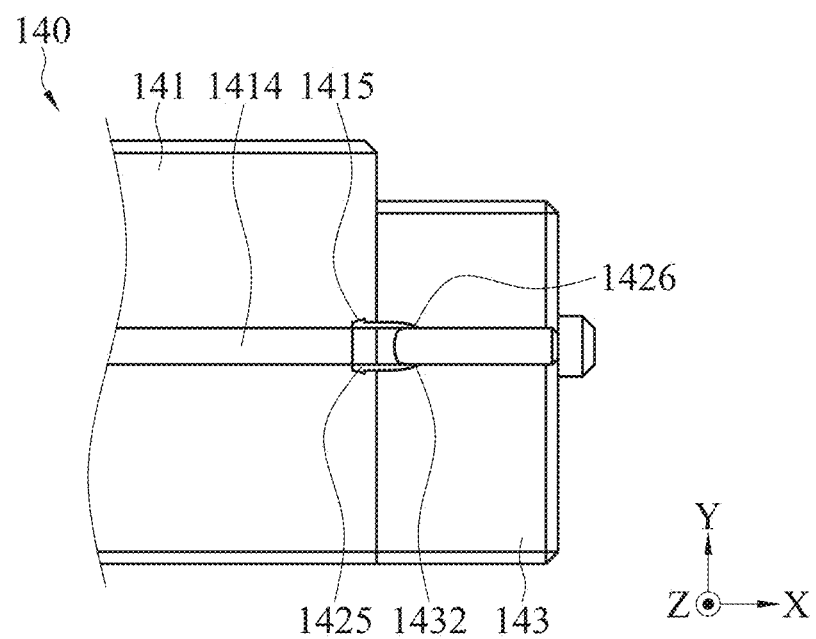
FIG. 13 is a schematic diagram of assembly of a second end cover, a second return member, and a second slide of an intelligent device for determining an operation point according to an embodiment.

Refer to FIG. 2, and also refer to FIG. 11 to FIG. 13. FIG. 11 is a three-dimensional diagram of a second return member of an intelligent device for determining an operation point according to an embodiment. FIG. 12 is a three-dimensional diagram of a second end cover of an intelligent device for determining an operation point according to an embodiment. FIG. 13 is a schematic diagram of assembly of a second end cover, a second return member, and a second slide of an intelligent device for determining an operation point according to an embodiment; and The second return member 142 and the first return member 132 have a same structure. As shown in FIG. 2, FIG. 11, and FIG. 13, two second return members 142 are respectively disposed at two ends of the second slide body 141 in the long axis direction X. The second slide body 141 includes a second return channel 1413 running through the second slide body 141 in the long axis direction X and a second circulation groove 1414 extending in the long axis direction X. Each second return member 142 includes a second return member body 1421, a second return groove 1422, a third end 1423, and a fourth end 1424. The third end 1423 and the fourth end 1424 are connected to the second return member body 1421 and protrude toward a same side from the second return member body 1421. In this embodiment, the second return member 142 is formed into a rough C shape. When the second return member 142 is assembled to the second slide body 141, the third end 1423 is connected to the second return channel 1413, and the fourth end 1424 is connected to the second circulation groove 1414, to make the second return channel 1413, the second return groove 1422, and the second circulation groove 1414 in communication, and enable the plurality of fourth balls 220 to roll in the second return channel 1413, the second return groove 1422, and the second circulation groove 1414. In this way, the fourth balls 220 cyclically roll between the linear rail body 110 and the second slide 140, to enable the second slide 140 to slide on the linear rail body 110.

As shown in FIG. 7 and FIG. 9, the second end 1324 of the first return member 132 forms a first engaging portion 1325 that tapers in an assembly direction (a direction away from the first return member body 1321). An end of the first circulation groove 1314 that corresponds to the first engaging portion 1325 forms a first engaging groove 1315 that tapers in the foregoing assembly direction (that is, a direction away from an opening of the first circulation groove 1314). In this embodiment, using a left end of the first slide 130 in FIG. 9 as an example, the first return member 132 engages the first engaging portion 1325 with the first engaging groove 1315 in a positive direction of the long axis direction X, the first engaging portion 1325 tapers in the positive direction of the long axis direction X, and the first engaging groove 1315 also tapers in the positive direction of the long axis direction X. In this way, when the first engaging portion 1325 is to be assembled into the first engaging groove 1315, a user should apply a sufficient force to allow the first engaging portion 1325 to enter the first engaging groove 1315, so that the first engaging portion 1325 is firmly engaged with the first engaging groove 1315.

As shown in FIG. 11 and FIG. 13, the fourth end 1424 of the second return member 142 forms a second engaging portion 1425 that tapers in an assembly direction (a direction away from the second return member body 1421), and an end of the second circulation groove 1414 that corresponds to the second engaging portion 1425 forms a second engaging groove 1415 that tapers in the foregoing assembly direction (that is, a direction away from an opening of the second circulation groove 1414). In this embodiment, the second return member 142 is engaged with the second engaging groove 1415 in the long axis direction X through the second engaging portion 1425. In this embodiment, using a right end of the second slide 140 in FIG. 13 as an example, the second return member 142 engages the second engaging portion 1425 with the second engaging groove 1415 in a negative direction of the long axis direction X, the second engaging portion 1425 tapers in the negative direction of the long axis direction X, and the second engaging groove 1415 also tapers in the negative direction of the long axis direction X. In this way, when the second engaging portion 1425 is to be assembled into the second engaging groove 1415, a user should apply a sufficient force to allow the second engaging portion 1425 to enter the second engaging groove 1415, so that the second engaging portion 1425 is firmly engaged with the second engaging groove 1415. In this way, through such a stepped engaging structure, the return members are stably fixed to the slides, which enables the balls to cyclically roll in the device more stably and smoothly, thereby increasing the service life of the device. Further, since the balls can roll stably and smoothly, the slides can be more stable and run smoothly when approaching each other to perform the determining operation on the object, thereby increasing the service life of the device.

Figure 10:
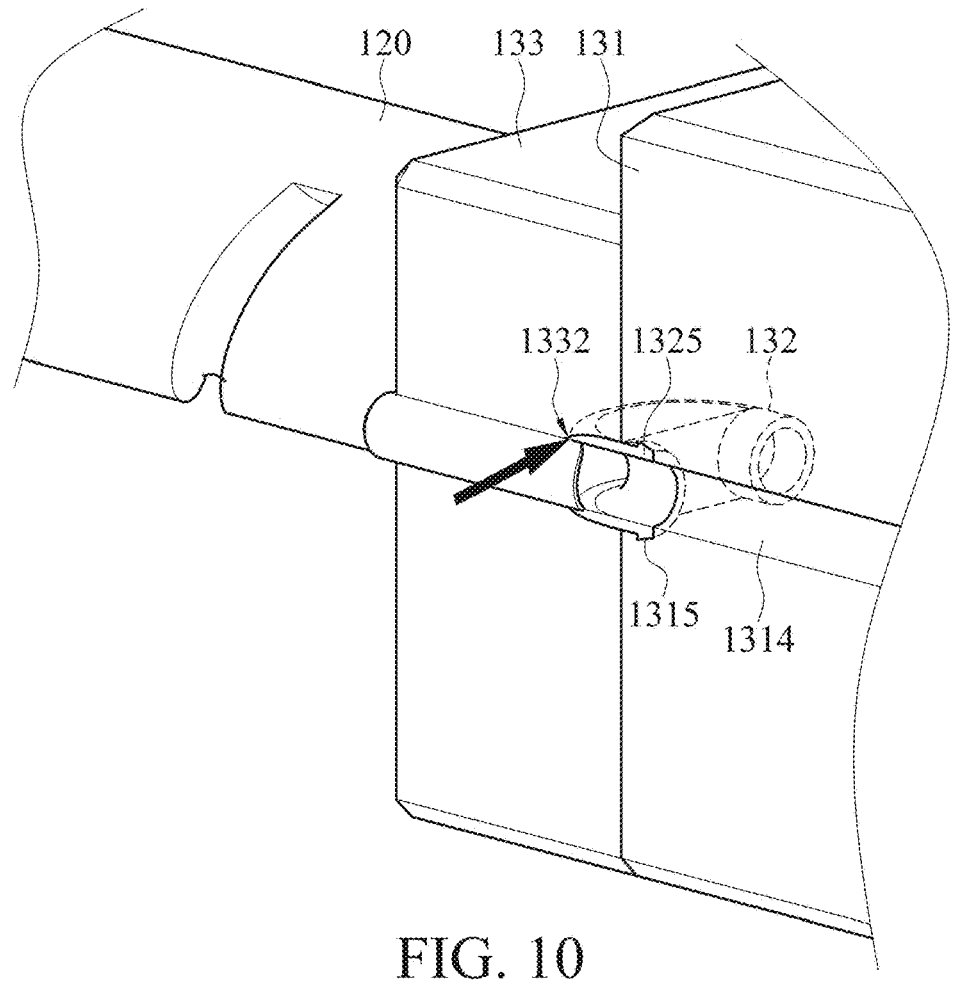
FIG. 10 is a perspective view assembly of a first end cover, a first return member, and a first slide of an intelligent device for determining an operation point according to an embodiment from another angle.

Still refer to FIG. 7 to FIG. 9, and also refer to FIG. 10. FIG. 10 is a perspective view assembly of a first end cover, a first return member, and a first slide of an intelligent device for determining an operation point according to an embodiment from another angle. The first slide 130 further includes two first end covers 133. The two first end covers 133 are respectively disposed at two ends of the first slide body 131. Each first end cover 133 is provided with a first assembly groove 1331 corresponding to each first return member 132. An end of the first return member 132 that corresponds to the first assembly groove 1331 forms a first lead angle portion 1326. As shown in FIG. 7, in this embodiment, the first lead angle portion 1326 is rounded. As shown in FIG. 10, a gap between the first lead angle portion 1326 and the first assembly groove 1331 forms a first oil path 1332. In this way, when a lubricating oil is filled through the first oil path 1332, the lubricating oil may enter an internal structure of the first slide 130 and lubricate the first slide 130 as indicated by an arrow in FIG. 10.

Still refer to FIG. 11 to FIG. 13. The second slide 140 further includes two second end covers 143. The two second end covers 143 are respectively disposed at two ends of the second slide body 141. Each second end cover 143 is provided with a second assembly groove 1431 corresponding to each second return member 142. An end of the second return member 142 that corresponds to the second assembly groove 1431 forms a second lead angle portion 1426. In this embodiment, the second lead angle portion 1426 is rounded. A gap between the second lead angle portion 1426 and the second assembly groove 1431 forms a second oil path 1432. In this way, lubrication can be performed through the second oil path 1432 as the first oil path 1332 shown in FIG. 10.

Still refer to FIG. 7 to FIG. 9. An end of the first assembly groove 1331 that faces the first return member 132 includes a first assembly groove edge 1333. The first assembly groove edge 1333 is rounded. That is, an edge portion of an opening of the first assembly groove edge 1333, namely, the edge portion surrounding the opening, is rounded as a whole to prevent the third balls 210 from colliding with a corner of the first assembly groove edge 1333 due to rolling and causing wear. Still refer to FIG. 11 to FIG. 13. An end of the second assembly groove 1431 that faces the second return member 142 includes a second assembly groove edge 1433. The second assembly groove edge 1433 is rounded. That is, an edge portion of an opening of the second assembly groove 1431, namely, the edge portion surrounding the opening, is rounded as a whole to prevent the fourth balls 220 from colliding with a corner of the second assembly groove edge 1433 due to rolling and causing wear.

Figure 14:
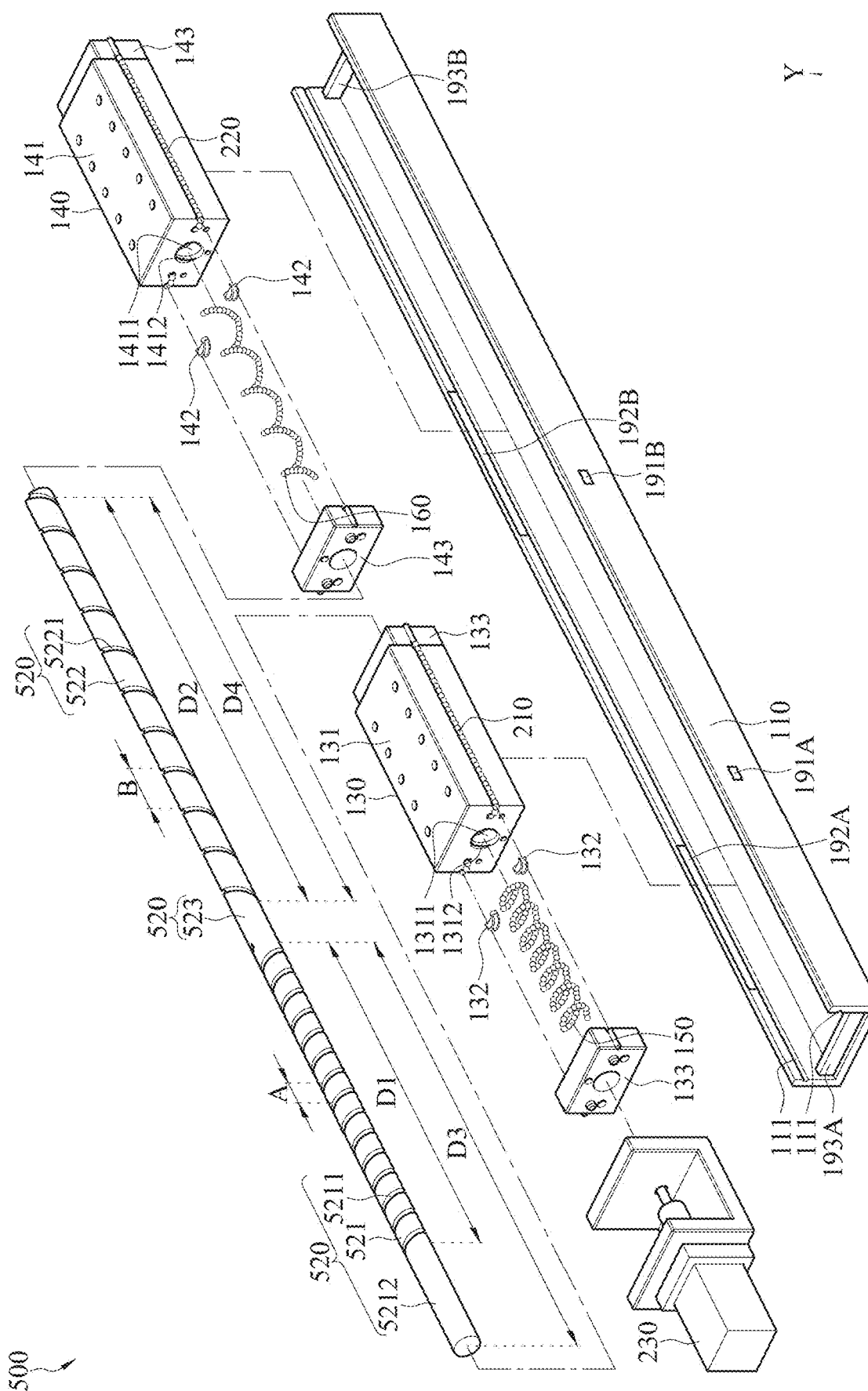
FIG. 14 is an exploded view of an intelligent device for determining an operation point according to another embodiment.

Refer to FIG. 14. FIG. 14 is an exploded view of an intelligent device for determining an operation point according to another embodiment. In another implementation, an intelligent device for determining an operation point 500 includes a linear rail body 110, a screw rod 520, a first slide 130, a second slide 140, a first ball 150, and a second ball 160. The same structures of the intelligent device for determining an operation point 500 and the intelligent device for determining an operation point 100 are marked with the same symbols and are not described again. As shown in FIG. 14, the screw rod 520 of the intelligent device for determining an operation point 500 includes a first screw rod portion 521, a second screw rod portion 522, and a determining operation area 523. The first screw rod portion 521 is provided with a first thread groove 5211 and an extending section 5212, and the second screw rod portion 522 is provided with a second thread groove 5221. The first thread groove 5211 and the second thread groove 5221 extend in opposite directions based on the determining operation area 523, and a lead B of the second thread groove 5221 is greater than a lead A of the first thread groove 5211. The extending section 5212 is located at an end of the first screw rod portion 521 that is away from the determining operation area 523. In this embodiment, as shown in FIG. 14, the extending section 5212 is a screw rod part that can be provided with thread grooves or not according to actual processing requirements. The extending section 5212 can be truncated according to design requirements or configured to dispose another structure, such as a stop block. In this embodiment, the extending section 5212 increases a length D3 of the first screw rod portion 521, so that the length D3 of the first screw rod portion 521 (approximately equal to the first length D1 plus a length of the extending section 5212) is roughly equal to a length D4 of the second screw rod portion 522 (approximately equal to the second length D2), and a ratio of the length of the first screw rod portion 521 to the length of the second screw rod portion 522 is equal to 1. That is, a distance from one end of the first screw rod portion 521 to a left side of the determining operation area 523 is roughly equal to a distance from one end of the second screw rod portion 522 to a right side of the determining operation area 523.

A method of making the length D3 and the length D4 equal can also balance weights of the first screw rod portion 521 and the second screw rod portion 522, or may be applied to an object with an offset center of gravity but a longer length on a side of the first screw rod portion 521.

What is claimed is:

1. An intelligent device for determining an operation point, comprising:
a linear rail body;
a screw rod, disposed on the linear rail body, wherein the screw rod comprises a first screw rod portion, a second screw rod portion, and a determining operation area, the determining operation area is located between the first screw rod portion and the second screw rod portion, the first screw rod portion is wrapped with a first thread groove, the second screw rod portion is wrapped with a second thread groove, the first thread groove and the second thread groove extend in opposite directions based on the determining operation area, and a lead of the second thread groove is greater than a lead of the first thread groove;
a first slide, slidably disposed on the linear rail body and corresponding to a side of the first thread groove, wherein the first slide comprises:
a first slide body, comprising a first through groove and a first ball circulation channel that run through the first slide body in a long axis direction, wherein the screw rod penetrates through the first through groove;
a second slide, slidably disposed on the linear rail body and corresponding to a side of the second thread groove, wherein the second slide comprises:
a second slide body, comprising a second through groove and a second ball circulation channel that run through the second slide body in the long axis direction, wherein the screw rod penetrates through the second through groove;
a plurality of first balls, rolling in the first thread groove and the first ball circulation channel to cyclically roll between the screw rod and the first slide;
a plurality of second balls, rolling in the second thread groove and the second ball circulation channel to cyclically roll between the screw rod and the second slide; and
two limiting devices, wherein one of the two limiting devices is disposed on the linear rail body at a right end of the first screw rod portion and adjacent to the determining operation area, and the other of the two limiting devices is disposed on the linear rail body at a left end of the second screw rod portion and adjacent to the determining operation area.

2. The intelligent device for determining an operation point according to claim 1, wherein a ratio of the lead of the first thread groove to the lead of the second thread groove is greater than or equal to ⅕.

3. The intelligent device for determining an operation point according to claim 1, wherein a ratio of a length of the first screw rod portion to a length of the second screw rod portion is greater than or equal to ⅕.

4. The intelligent device for determining an operation point according to claim 1, wherein the first thread groove has a first length from a thread starting point adjacent to the determining operation area to a thread end point away from the determining operation area, the second thread groove has a second length from a thread starting point adjacent to the determining operation area to a thread end point away from the determining operation area, and a ratio of the first length to the second length is greater than or equal to ⅕.

5. The intelligent device for determining an operation point according to claim 1, wherein the first screw rod portion further comprises an extending section located at a position that is away from a tail end of the determining operation area, and a ratio of a length of the first screw rod portion to a length of the second screw rod portion is equal to 1.

6. The intelligent device for determining an operation point according to claim 1, further comprising a plurality of third balls and a plurality of fourth balls, wherein the first slide further comprises a plurality of first return members disposed at two ends of the first slide body in the long axis direction respectively; the first slide body comprises a first return channel running through first slide body in the long axis direction and a first circulation groove extending in the long axis direction; each first return member comprises a first return member body, a first return groove, a first end, and a second end, wherein the first end and the second end protrude from the first return member body and face toward a same side; the first end is connected to the first return channel, and the second end is connected to the first circulation groove, to make the first return channel, the first return groove, and the first circulation groove in communication, and enable the plurality of third balls to roll in the first return channel, the first return groove, and the first circulation groove; and the second slide further comprises a plurality of second return members disposed at two ends of the second slide body in the long axis direction respectively; the second slide body comprises a second return channel running through the second slide body in the long axis direction and a second circulation groove extending in the long axis direction; each second return member comprises a second return member body, a second return groove, a third end, and a fourth end, wherein the third end and the fourth end protrude from the second return member body and face toward a same side; the third end is connected to the second return channel, and the fourth end is connected to the second circulation groove, to make the second return channel, the second return groove, and the second circulation groove in communication, and enable the plurality of fourth balls to roll in the second return channel, the second return groove, and the second circulation groove.

7. The intelligent device for determining an operation point according to claim 6, wherein the first slide further comprises two first end covers, wherein the two first end covers are disposed at two ends of the first slide body respectively, each first end cover is provided with a first assembly groove corresponding to the first return member, an end of the first return member that corresponds to the first assembly groove forms a first lead angle portion, and a gap between the first lead angle portion and the first assembly groove forms a first oil path; and the second slide further comprises two second end covers, wherein the two second end covers are disposed at two ends of the second slide body respectively, each second end cover is provided with a second assembly groove corresponding to the second return member, an end of the second return member that corresponds to the second assembly groove forms a second lead angle portion, and a gap between the second lead angle portion and the second assembly groove forms a second oil path.

8. The intelligent device for determining an operation point according to claim 7, wherein an end of the first assembly groove that faces the first return member comprises a first assembly groove edge, the first assembly groove edge is rounded; and an end of the second assembly groove that faces the second return member comprises a second assembly groove edge, and the second assembly groove edge is rounded.

9. The intelligent device for determining an operation point according to claim 1, further comprising a motor, wherein the motor is disposed on a side of the linear rail body that is close to the first screw rod portion.

10. The intelligent device for determining an operation point according to claim 6, wherein the second end of the first return member forms a first engaging portion that tapers in an assembly direction, an end of the first circulation groove that corresponds to the first engaging portion forms a first engaging groove that tapers in the assembly direction, and the first return member is engaged with the first engaging groove through the first engaging portion; and the fourth end of the second return member forms a second engaging portion that tapers in the assembly direction, an end of the second circulation groove that corresponds to the second engaging portion forms a second engaging groove that tapers in the assembly direction, and the second return member is engaged with the second engaging groove through the second engaging portion.

11. The intelligent device for determining an operation point according to claim 1, further comprising two position sensing devices, wherein the two position sensing devices are disposed on the linear rail body corresponding to the first slide and the second slide respectively, and monitor movement statuses of the first slide and the second slide through two sensing members attached to the first slide and the second slide respectively.

12. The intelligent device for determining an operation point according to claim 1, wherein the linear rail body comprises two anti-collision strips, and the two anti-collision strips are disposed on two opposite ends of the linear rail body respectively.

* * * * *